T. C. CLIFFORD.
METER SYSTEM.
APPLICATION FILED SEPT. 22, 1910.

1,119,401.

Patented Dec. 1, 1914.
2 SHEETS—SHEET 1.

WITNESSES:

INVENTOR.
Thomas C. Clifford
BY
HIS ATTORNEY IN FACT.

T. C. CLIFFORD.
METER SYSTEM.
APPLICATION FILED SEPT. 22, 1910.

1,119,401.

Patented Dec. 1, 1914.
2 SHEETS—SHEET 2.

WITNESSES

INVENTOR.
Thomas C. Clifford
BY
HIS ATTORNEY IN FACT.

UNITED STATES PATENT OFFICE.

THOMAS C. CLIFFORD, OF PITTSBURGH, PENNSYLVANIA.

METER SYSTEM.

1,119,401. Specification of Letters Patent. Patented Dec. 1, 1914.

Application filed September 22, 1910. Serial No. 583,207.

*To all whom it may concern:*

Be it known that I, THOMAS C. CLIFFORD, a citizen of the United States, and a resident of Pittsburgh, in the county of Allegheny and State of Pennsylvania, have made a new and useful Invention in Meter Systems, of which the following is a specification.

This invention relates to meter systems and particularly to systems in which means are employed for passing the water through a meter and measuring the normal consumption under normal conditions of flow and for delivering water through the service pipes or mains without passing it through the meter during abnormal conditions of flow or when abnormal demands are made on the mains for water. Systems of this type ordinarily employ a valve in the service pipe or main, which is closed during normal flows, and a by-pass passage around the valve, in which a meter is located and through which the water passes during normal flows. In addition to this, means are ordinarily employed for detecting or for detecting and registering the abnormal flows.

An object of my invention is to produce improved means for controlling the operation of the valve in the service pipe or main and for holding it in a closed position during normal flows.

A further object is to produce improved means for detecting abnormal flows of water through the mains and also for measuring the amount of water delivered during the time of abnormal flows.

A further object is to produce means for closing the valve in the service pipe or main quickly and decisively when the abnormal demand in the main has ceased and the flow has decreased to the normal rate.

These and other objects I attain in an apparatus embodying the features herein described and illustrated.

Figure 1:
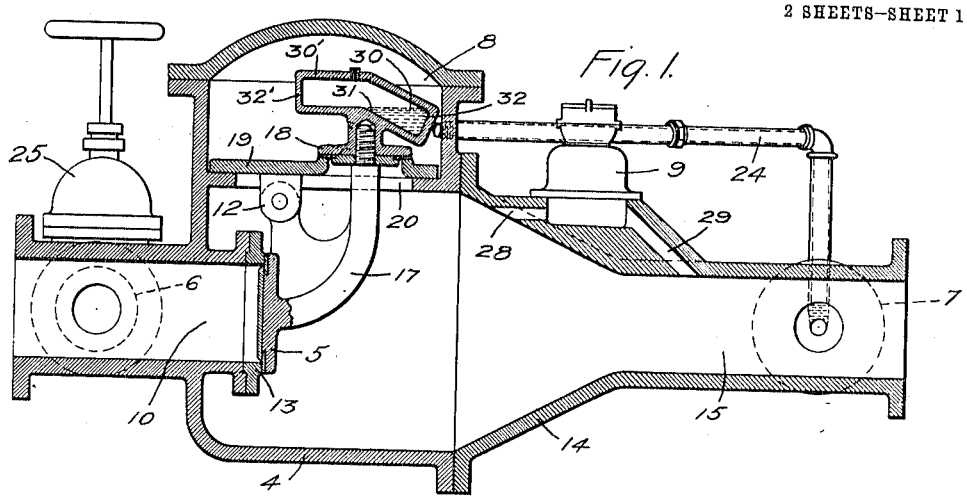
Figure 2:
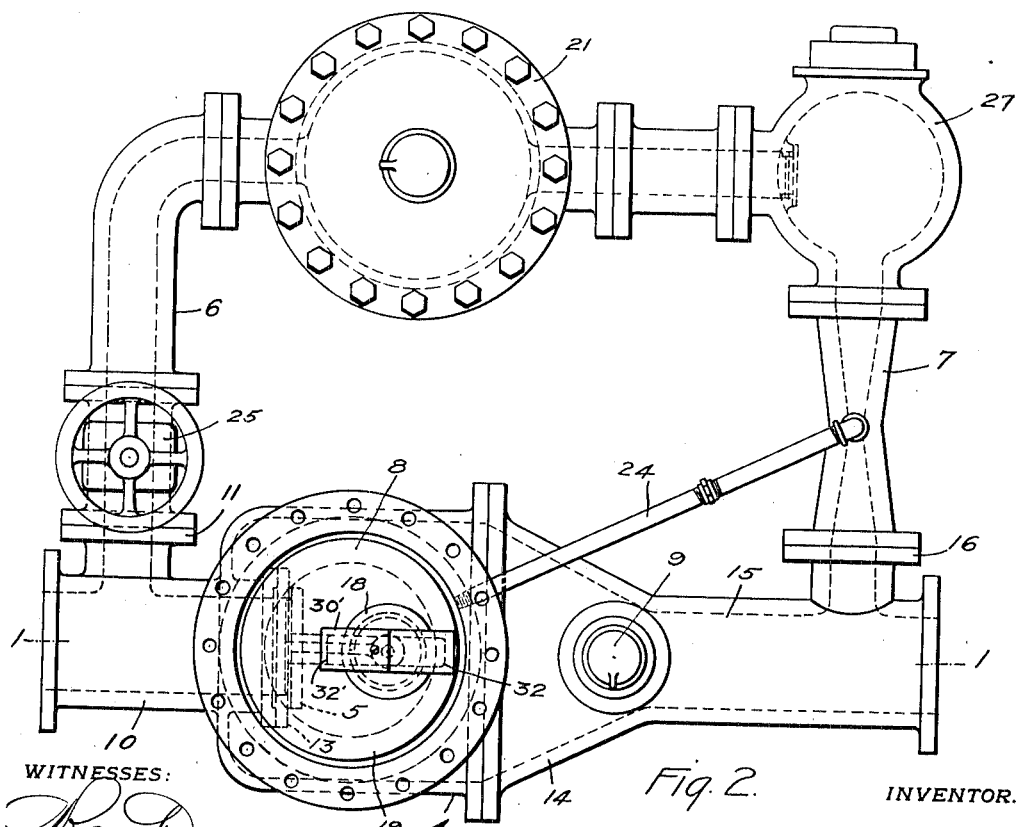
Figure 3:
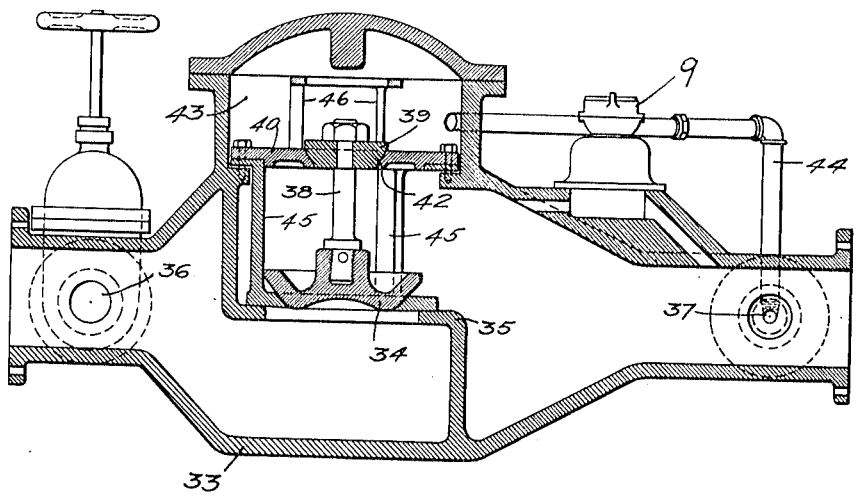

In the drawings accompanying this application and forming a part thereof, Figure 1 is a sectional view along the line 1—1 of Fig. 2 and illustrates an embodiment of my invention. Fig. 2 is a plan view of the apparatus shown in Fig. 1, the top cover of the valve chamber being removed for convenience of illustration. Fig. 3 is a sectional view corresponding to the sectional view in Fig. 1 and illustrates a modification of a detail of my invention.

Referring to the drawings, the apparatus illustrated as embodying my invention includes a valve casing 4, adapted to be connected into the main or service pipe, a valve 5 located in the casing, a by-pass 6 communicating with the main or service pipe and located around the valve 5, a Venturi tube 7 located in the by-pass, a valve controlling chamber 8 provided in the casing 4, and a proportional meter 9 for measuring the flow of water through the main when the valve 5 is open.

The casing 4 is provided with a flanged inlet 10 which is adapted to be connected to the service pipe or main, and which is provided with an offtake flange 11, to which the piping of the by-pass 6 may be connected. The valve 5 is hinged on the casing at 12 and is adapted to seat on a reëntrant flange 13 and close communication between the upstream portion of the main and interior of the valve casing 4. The downstream side of the casing is provided with a truncated cone shaped section 14, which is integrally formed with a cylindrical section or flanged outlet 15 of the same diameter as the main and adapted to be connected to the main. The outlet 15 is provided with an intake flange 16, to which the delivery end of the by-pass piping is adapted to be connected. The valve 5 is provided with a curved valve stem 17, the upper end of which projects into the chamber 8 and is provided with a disk 18 adapted to seat on a diaphragm 19 and close a port 20 located between the chamber 8 and the valve chamber, when the valve 5 is closed. The valve 5 is so arranged that a greater area is exposed to the pressure in the valve chamber than is exposed to the pressure in the main as transmitted through the reëntrant flange 13. With this arrangement, the valve is held firmly to its seat by the differential pressure thus obtained when the pressures in the valve chamber and in the flange 13 are equal or approximately equal. The disk 18 is so arranged that a greater area is exposed to the water pressure in the chamber 8 than is exposed to the pressure in the valve chamber and the disk will be held to its seat by the differential pressure and will, therefore, effectively aid in holding the valve 5 closed, when the pressure in chamber 8 equals or is approximately equal to the pressure in the valve chamber.

A meter 21 is located in the by-pass 6 and is so arranged that all water passing through the by-pass passes through it. The discharge port of the meter communicates with the inlet end of the Venturi tube 7 and the Venturi tube communicates with the main, on the down-stream side of the valve 5, through the flange 16.

The throat section of the Venturi tube communicates with the chamber 8 through piping 24, and consequently the pressure in the chamber 8 varies directly with the variations of pressure at the throat of the tube or inversely with the variations in the velocity of flow through the Venturi tube. A gate valve 25 is located in the by-pass 6 between the flange 11 and the meter 21 and a check valve 27 may be located between the meter and the Venturi tube (as illustrated) or between the meter and the section 16. With this arrangement of valves, the meter 21 can be taken out and repaired without cutting off the flow of water through the main.

During normal conditions and normal flows the pressures in the service pipe or main on each side of the valve 5 are approximately equal and since the valve 5 is closed all of the water delivered through the main passes around the valve 5 and through the by-pass 6. These flows are measured by the meter 21. Since all of the water passing through the by-pass 6 must pass through the Venturi tube 7 and since the throat of the Venturi tube communicates with the valve controlling chamber 8, the pressure in this chamber will vary inversely with the variations of flow through the by-pass. With this arrangement the Venturi tube can be so proportioned that the pressure in the chamber 8 will drop any determined amount for any rate of flow through the by-pass. While it is apparent, as has been described, that the disk 18 will aid in holding the valve 5 in the closed position when the pressures in the chamber 8 and the valve chamber are approximately equal, it will also be apparent that the disk 18 will tend to open or aid in opening the valve 5 when the pressure in the valve chamber exceeds the pressure in the chamber 8 a determined amount.

The apparatus illustrated is so constructed that the existing water pressures will hold the valve closed during all normal flows or all normal demands upon the water main, but under abnormal conditions of flow, for example in case of fire, the water pressures will vary to such an extent that the valve 5 will be unseated and opened. The Venturi tube 7 is so proportioned that the pressure in the chamber 8 will drop below the pressure in the valve chamber during abnormal flows through the by-pass, and the water pressure in the valve chamber on the disk 18 will preponderate over the pressure in the chamber 8 and tend to open the valve 5. Under such conditions, that is, during abnormal flows through the by-pass, the pressure in the main on the down-stream side of the valve 5 is reduced so that it is no longer capable of closing the valve 5 and the pressure of the water in the main above the valve or in the re-entrant flange 13, against the valve 5, and the pressure in the valve chamber, against the under side of the disk 18, are sufficient to overcome the closing pressures and open the valve 5. As soon as the valve is opened and a flow of water is established through the valve casing 4 to the down-stream portion of the main, the valve 5 will be moved to and held in its extreme open position by the flow of water and the flow of water through the by-pass 6 practically ceases.

The cone shaped section 14 and the section 15 do not in any way restrict the flow of water through the main, but they are so proportioned that they do occasion a difference in pressure between the inlet end of the cone shaped member and a point at or immediately adjacent to the junction between the cone shaped member 14 and the flange 15. I take advantage of this difference in pressure in establishing a flow of water through the proportional meter 9 and therefore, provide a delivery passage 28 for the meter which communicates with the valve chamber near the point of the largest diameter of the cone shaped section 14. I also provide a discharge passage 29 for the meter 9 which communicates with the outlet 15 near its junction with the section 14 and in this manner I establish a flow of water through the meter which is proportional to the flow of water through the valve casing 4 when the valve 5 is open. That this flow is proportional to the abnormal flow through the main will be apparent when it is understood that the pressure at or near the smallest diameter of the cone shaped section 14 varies inversely with the velocity of flow through the valve casing 5.

When the flow through the main has been reduced a determined amount or to normal flow, the valve 5 will tend to drop, by its own and the weight of its connected parts, to its seat and close off the flow of water through the flange 13 to the casing 4. I have provided means for expediting this action of the valve and for causing it to move to its seat decisively or with a snap and to immediately shut off the flow of water through the chamber 4 when the flow through the main has decreased to normal. To this end I provide a shifting weight on the valve stem 17 so arranged that it will move quickly from one extreme position, or from an intermediate position to the other extreme position and will be effective in closing the valve 5. I preferably employ mercury 30 as the shifting weight and inclose it in a casing 30' which is mounted on the upper end of the valve stem 17. The casing is only partially filled with mercury and is provided with a supporting surface 31 one portion of which is inclined to the other so that the mercury will be maintained either in one end or the other of the casing for all positions of the valve 5.

When the valve is open the mercury will be maintained in the end 32' of the casing. The valve 5 will drop to occupy different positions as the flow of water through the valve casing 4 decreases and after the valve has moved to a certain position the mercury in the casing 30 will move from the end 32' and flow down the inclined portion of the surface 31 to the end 32 of the casing. This shifting of the mercury will close the valve 5 and the flow of water will again be established through the by-pass 6 and the meter 21 and will again establish the normal conditions of pressure in the chamber 8 and the valve chamber. It will be apparent that the mercury may be replaced by any shifting weight and that the shape of the casing 30' may be varied to suit the conditions.

In Fig. 3 I have shown a modified form of the main valve and the valve controlling mechanism. A valve casing 33 is located in the service pipe or water main and incloses a valve 34 which seats on a diaphragm 35 provided in the casing and closes direct communication between the up-stream and down-stream portions of the main. A by-pass corresponding to the by-pass 6 of Fig. 1 communicates with the valve casing through an inlet port 36 and a delivery port 37 and delivers water around the valve 34 during normal flows. The valve 34 is provided with a valve stem 38 on which a disk 39 is mounted. The disk 39 seats on a diaphragm 40 and closes a port 42 provided in the diaphragm and located between the interior of the casing 33 and a valve controlling chamber 43 which corresponds in its functions to the chamber 8 of the apparatus illustrated in Figs. 1 and 2. The chamber 43 communicates with the throat of the Venturi tube through piping 44, the Venturi tube being located in the by-pass passage. The valve 34 and the disk 42 are constructed so as to produce a differential pressure which will hold the valve closed, when the pressures in the chamber 43 and on each side of the diaphragm 35 in the valve casing are equal. When the flow through the by-pass passage is increased to such an extent that the pressure in the chamber 43 is decreased below the pressure in the casing and the pressure in the casing below the diaphragm 35 preponderates over the water pressure above the valve 34, the valve will be lifted from its seat and a flow of water will result through the valve casing 33 which will be effective in raising the valve 34 and holding it in an open position. Guides 45 and guides 46 are provided for the valve and the disk respectively, for the purpose of guiding the valve during its reciprocations. The valve 34 moves downwardly by its own weight as the flow of water through the casing 33 decreases, and finally, after the flow is reduced to normal, the valve will close the port and the normal flow will then pass through the by-pass and the meter located in the by-pass. The operation of the apparatus is similar to the operation of the apparatus illustrated in Figs. 1 and 2, and a proportional meter 9 is provided which registers the abnormal flows of water through the valve casing.

Having now described my invention, what I claim is:

1. In combination with a water main, a valve closed during normal flows through the main, means for by-passing water around the valve, a chamber to receive water, means for establishing communication between said chamber and said by-passing means, whereby the pressure in the chamber will vary in accordance with variations in the normal flows through the main, and means in the chamber connected to the valve and responsive to the pressure of the water to close the valve.

2. In combination with a main, a valve located in the main, a by-pass around the valve, a chamber, means of communication between the chamber and the by-pass whereby pressure in the chamber will vary in accordance with variations in the normal flows through the main, and means in the chamber connected to the valve and responsive to pressure to close said valve.

3. In combination with a main, a valve located in the main, a chamber to receive water, means in the chamber connected to the valve and responsive to the pressure of water to close said valve during normal flows, a by-pass around the valve, a Venturi tube located in said by-pass, and means of communication between the tube and the chamber whereby pressure in said chamber will vary in accordance with variations in the normal flows through the main.

4. In combination with a main, a valve located in the main, a by-pass around the valve and including a Venturi tube, a chamber for exerting closing pressure on the valve during normal flows through the main, and means of communication between the chamber and the Venturi tube for varying the pressure within the chamber in accordance with variations of flow through the by-pass.

5. In combination with a main, a valve located in the main, a by-pass including a Venturi tube communicating with the main and extending around the valve and through which water passes when the valve is closed, a chamber for exerting closing pressure on said valve during normal flows through the main, and a passage connecting said chamber with said Venturi tube.

6. In combination with a service pipe or main, a valve located in the main, a pressure chamber, means subjected to the pressure in said chamber to close said valve during normal conditions, a by-pass around the valve through which the water flows when said valve is closed, a Venturi tube located in said by-pass, and piping connecting the throat of said tube with the interior of said chamber.

7. In combination with a water main having an enlarged section, a valve located in the main, a by-pass including a Venturi tube extending around the valve and through which normal flows pass, a meter located in said by-pass for measuring the normal flows, a pressure chamber, means of communication between said chamber and said tube whereby the pressure in said chamber varies in accordance with variations in flow through the tube, means subjected to the pressure in the chamber for closing the valve, and a proportional meter communicating with said main for measuring abnormal flows when said valve is open.

8. In combination with a service pipe or main, a valve casing located in said main, a valve located in said casing for shutting off an unrestricted flow of water through the main and means whereby the valve is closed during normal and open during abnormal flows through said main, a truncated cone-shaped section included in said casing and located on the down-stream side of said casing, and a proportional meter operating on the difference of pressure occasioned by said section.

9. In combination with a water main, a valve casing located in said main, a valve located in said casing for shutting off an unrestricted flow of water through said main, a convergent section communicating with said valve casing, on the down-stream side, and with said main, and a proportional meter operating on the difference of pressure occasioned by said convergent section.

10. In combination with a meter system, means for controlling the flow through said system including a valve, means responsive to variable liquid pressures for exerting a closing pressure on said valve, and means for reducing the closing pressure exerted by said first mentioned means to a minimum at the time of opening said valve.

11. In combination with a service pipe or main, a by-pass, a meter in the by-pass, a valve for causing normal flows of water to pass through the by-pass and through the meter and responsive to variations in head on opposite sides thereof, a pressure chamber for exerting a closing pressure on said valve during normal conditions of flow through said by-pass, and means located in the by-pass and communicating with said chamber for reducing the pressure exerted by said chamber to a minimum during abnormal flows through the by-pass.

12. In combination with a main, a valve responsive to variations in flow through the main for shutting off an unrestricted flow of water through the main, a by-pass around the valve for delivering water while the valve is closed, a pressure chamber for exerting a closing pressure on said valve, means communicating with said chamber for reducing the pressure exerted thereby on said valve to a minimum when the pressure differences on opposite sides of said valve are increased to a maximum, and separate means for registering the flow through the by-pass and the flow through the main when the valve is open.

13. In combination with a service pipe or main having a by-pass, a valve between the ends of the by-pass responsive to variations in pressure head on opposite sides thereof and for closing off the main during normal flows through the by-pass, a shiftable weight actuated by a change in position of said valve to change its position with relation thereto, and a pressure chamber for exerting a closing pressure on said valve when said valve is closed and means of communication between said chamber and said by-pass.

14. A water meter comprising two measuring passageways, the first provided with means for accurate measurement of small rates of flow, the second adapted for large rates of flow and provided with means for measuring the same proportionally and with small loss of head, a pivotally mounted check valve for said second passageway, a pressure chamber for exerting a closing pressure on said check valve while said check valve is closed, and means between said first measuring passage and said chamber for delivering water pressure to said chamber and for varying the pressure delivered in response to variations in flow.

15. In combination with a meter system, means for controlling the flow in said system including a valve, a pressure chamber for exerting a closing pressure on said valve while said valve is closed, and means for transmitting a variable pressure to said chamber in response to variations in flow through said system.

16. In combination with a meter system, a water main, a valve located in the main and closed during normal flows, means for delivering normal flows around the valve, a pressure chamber for exerting closing pressure on the valve during normal flows, and means whereby the pressure in the chamber is varied in accordance with variations in normal flows.

17. In combination with a service pipe or main, a valve located in the main, a bypass around the valve for normal flows, a meter for recording the flow through the by-pass, a meter for recording the flow through the main while the valve is open, and a pressure chamber for exerting a closing pressure on the valve while the valve is closed and means of communication between said by-pass and said chamber.

18. In combination with a service pipe or main, a valve located in the main and responsive to variations in pressure head on opposite sides thereof for opening and permitting an unrestricted flow of water through the main during abnormal flows, and closing during normal flows through the main, separate meters for registering normal and abnormal flows through the main, a pressure chamber for exerting a closing pressure on the valve while the valve is closed, and means communicating with the chamber for varying the pressure exerted therein in response to and in an inverse ratio with the variations in flow through the main.

19. In combination with a service pipe or main, a valve located in the main and responsive to variations in pressure head on opposite sides thereof for opening and permitting an unrestricted flow of water through the main during abnormal flows, and closing during normal flows through the main, a pressure chamber for exerting a holding pressure on the valve while the valve is closed, means communicating with the chamber for varying the pressure exerted therein in response to variations in flow through the main, and means for registering flows through the main.

In testimony whereof, I have hereunto subscribed my name this 20th day of September, 1910.

THOMAS C. CLIFFORD.

Witnesses:
C. W. McGhee,
E. W. McCallister.